(12) United States Patent
Neubauer

(10) Patent No.: US 8,043,082 B2
(45) Date of Patent: Oct. 25, 2011

(54) INJECTION HEAD FOR A CORRUGATOR FOR THE PRODUCTION OF PLASTICS PIPES

(75) Inventor: Gerhard Neubauer, Königsberg-Römershofen (DE)

(73) Assignee: UNICOR GmbH, Hassfurt (DE)

( * ) Notice: Subject to any disclaimer, the term of this patent is extended or adjusted under 35 U.S.C. 154(b) by 435 days.

(21) Appl. No.: 12/376,755

(22) PCT Filed: Aug. 10, 2007

(86) PCT No.: PCT/EP2007/007095
§ 371 (c)(1),
(2), (4) Date: Feb. 6, 2009

(87) PCT Pub. No.: WO2008/017496
PCT Pub. Date: Feb. 14, 2008

(65) Prior Publication Data
US 2010/0189838 A1 Jul. 29, 2010

(30) Foreign Application Priority Data
Aug. 11, 2006 (DE) .......................... 10 2006 037 885

(51) Int. Cl.
*B29C 47/20* (2006.01)
(52) U.S. Cl. ...................... 425/133.1; 425/380; 425/381; 425/463; 425/466; 425/467
(58) Field of Classification Search .............. 425/133.1, 425/380, 381, 463, 466, 467
See application file for complete search history.

(56) References Cited

U.S. PATENT DOCUMENTS

| | | | |
|---|---|---|---|
| 3,743,456 A | 7/1973 | Cini | |
| 3,809,515 A | 5/1974 | Farrell | |
| 3,996,323 A | 12/1976 | Hegler | |
| 4,846,660 A | 7/1989 | Drossbach | |
| 4,865,797 A | 9/1989 | Jarvenkyla | |
| 5,690,972 A | 11/1997 | Planeta et al. | |
| 5,788,902 A | 8/1998 | Planeta | |
| 6,616,437 B1 * | 9/2003 | Neubauer | ................. 425/133.1 |
| 6,787,092 B2 * | 9/2004 | Chan et al. | .................... 264/511 |
| 7,097,441 B2 * | 8/2006 | Sagar et al. | ................. 425/133.1 |
| 7,264,457 B2 | 9/2007 | Lupke et al. | |

(Continued)

FOREIGN PATENT DOCUMENTS

DE 29 11 833 C2 10/1979

(Continued)

*Primary Examiner* — Yogendra Gupta
*Assistant Examiner* — Joseph Leyson
(74) *Attorney, Agent, or Firm* — Hoffmann & Baron, LLP

(57) ABSTRACT

An injection head (10) is described for a corrugator which is intended for the production of plastics pipes. The injection head (10) has a main head (12), a nozzle body (14) and a mouthpiece means (16) with at least one mouthpiece (32, 36). The main head (12) is embodied with first channels (50, 52) and the nozzle body (14) is embodied with second channels (58, 60) which are flow-connected to the first channels (50, 52). The/each mouthpiece (32, 36) has a central body (74, 76) and a sleeve body, (78, 80) surrounding said central body. On its lateral surface (82, 84) facing the sleeve body (78, 80), the central body (74, 76) is embodied with wound plastics distributor grooves (86, 88) which are flow-connected by means of connecting portions (114, 120) to a concentric annular groove (112, 116) which is formed on the reverse surface (90, 92) of the central body (74, 76) and into which the second channels (58, 60) of the nozzle body (14) discharge.

17 Claims, 3 Drawing Sheets

U.S. PATENT DOCUMENTS

| | | |
|---|---|---|
| 7,625,196 B2 | 12/2009 | Lupke et al. |
| 2004/0062829 A1 | 4/2004 | Kossner et al. |
| 2004/0074554 A1 | 4/2004 | Starita |
| 2005/0106280 A1 | 5/2005 | Karr et al. |

FOREIGN PATENT DOCUMENTS

| | | |
|---|---|---|
| DE | 10 2004 002 433 A1 | 8/2004 |
| EP | 0 208 055 A1 | 1/1987 |
| EP | 0 230 055 B1 | 7/1987 |
| NL | 7409440 | 9/1975 |
| RU | 2258002 | 8/2005 |
| SU | 596469 | 3/1978 |
| SU | 1362652 | 12/1987 |
| SU | 1598860 | 10/1990 |
| WO | 02066229 A1 | 8/2002 |

\* cited by examiner

INJECTION HEAD FOR A CORRUGATOR FOR THE PRODUCTION OF PLASTICS PIPES

This application is the U.S. National Phase of, and Applicants claim priority from, International Application Number PCT/EP2007/007095 filed Aug. 10, 2007, which is incorporated herein by reference in its entirety.

BACKGROUND OF THE INVENTION

The invention relates to an injection head for a corrugator for the production of plastics pipes, with a main head having at least one connection for a plastics extruder, with a nozzle body which is attached to the main head so as to be in axial alignment and with at least one mouthpiece which is attached to the nozzle body so as to be in axial alignment and has an output annular slot for the corresponding plastics material, the at least one mouthpiece having a central body and a sleeve body surrounding said central body which determine the associated output annular slot.

Injection heads of this type are known for example from U.S. Pat. No. 3,743,456, EP 0 208 055 A1, EP 0 230 055 A1 or DE 2 911 833 C2. They are used for example for the production of transverse ribbed pipes made of a single plastics material or for the production of transverse ribbed pipes made of different plastics materials. Plastics pipes of the latter type can have for example a smooth inner layer made of a plastics material and a corrugated outer layer which is integrally connected to said inner layer and is made of the same plastics material or a second plastics material differing therefrom.

In the case of known injection heads of the generic type for the production of plastics pipes, in particular transverse ribbed pipes, consisting of a smooth inner layer and a corrugated outer layer, the nozzle body has for the outer layer an outer sleeve element and an inner sleeve element set radially apart therefrom and for the inner layer an outer sleeve element and an inner sleeve element set radially apart therefrom. The nozzle body of known injection heads of the generic type therefore consists of a corresponding number of individual parts; this affects the manufacturing costs of known injection heads. The same applies to the main head of the known injection heads. A further defect of known injection heads of the generic type consists in the fact that the at least one mouthpiece, which is attached to the nozzle body at the front, requires spacer rings for precise centering thereof, and that there is also a need, between the central body and the sleeve body of the mouthpiece that surrounds said central body, for centering pins which impede the flow of the melted plastics material, so that striation in the melted plastics material issuing from the output annular slot is often inevitable. A very basic defect of known injection heads of the generic type consists in the fact that changing the injection head for the production of plastics pipes having a desired different diameter is time-consuming, i.e. the exchanging times are relatively long.

SUMMARY OF THE INVENTION

In the knowledge of these conditions, the invention is based on the object of providing an injection head of the type mentioned at the outset that is constructed in a comparatively simple manner and consists of relatively few individual parts, so that its production costs are reduced, the exchanging times for producing plastics pipes having differing diameters are comparatively short, and undesirable striation in the produced plastics pipe is reliably avoided.

According to the invention, this object is achieved by the injection head having the features of claim 1, i.e. in that the main head is embodied with axially oriented first channels which are distributed uniformly in the circumferential direction for the at least one plastics material, in that the nozzle body is embodied with axially oriented second channels which are distributed uniformly in the circumferential direction and are flow-connected to the first channels of the main head, and in that the central body of the at least one mouthpiece has a lateral surface which faces the respective sleeve body and has wound plastics distributor grooves which are distributed uniformly in the circumferential direction and each of which is flow-connected by means of a connecting portion to an annular groove which is formed on the reverse surface, facing the main head, of the central body and into which the second channels discharge.

In the case of the injection head according to the invention, the main head therefore advantageously consists, as it were, of a compact body having first channels, i.e. the number of its individual parts is small compared to the main head of known injection heads of the generic type. The same applies to the nozzle body, which also consists substantially of a compact body having two channels, so that the production costs of the injection head according to the invention advantageously are relatively low. A further advantage of the injection head according to the invention consists in the fact that as a result of the wound plastics distributor grooves, which are formed in the lateral surface of the central body of the at least one mouthpiece and are distributed uniformly in the circumferential direction, a very uniform output of the melted plastics material from the associated output annular slot is ensured, striation in the melted plastics material issuing from the output annular slot being prevented by the design according to the invention of the/each mouthpiece.

A major advantage of the injection head according to the invention consists in the possibility of being able to carry out a tool exchange in a very time-efficient manner. This tool exchange relates both to the exchange of the at least one mouthpiece and to the exchange of a nozzle body having mouthpieces with another nozzle body having at least one associated mouthpiece. According to the invention, the nozzle gap setting of the output annular slot in the/each mouthpiece is preserved in an advantageous manner—even without the centering pins of known mouthpieces. The nozzle gap can also easily be continuously adjusted in an advantageous manner.

In the case of the injection head according to the invention, the main head can have a connection or at least two connections for extruders and a number of first channels corresponding to the number of extruders. In this case, all first channels can be provided set uniformly apart from one another on a common pitch circle of the main head and alternate in association with the respective connection.

According to the invention, the nozzle body expediently has smaller cross-sectional dimensions than the main head, so that the injection head according to the invention can extend in an appropriate manner into the molding section of a corrugator, wherein it is expedient if there is provided between the main head and the nozzle body an intermediate body which is embodied with transfer channels which flow-connect the first channels of the main head to the second channels of the nozzle body. In the case of an embodiment of this type, it is preferable if the intermediate body is securely connected to the main head and if the nozzle body is releasably connected to the main head. This releasable connection of the nozzle body to the main head of the injection head according to the invention forms in an advantageous manner a first parting plane of the injection head, on which a time-efficient tool exchange is possible. For this purpose, the nozzle body can have on its back end portion an annular flange having fastening holes and the nozzle body can be releasably fastened to the annular flange on the end face of the intermediate body. For this purpose, threaded bolts can be inserted through the fastening holes in the annular flange and screwed into threaded holes formed in the end face of the intermediate body.

According to the invention, the second channels, which are provided for a plastics material, in the nozzle body are preferably provided set uniformly apart from one another on a pitch circle or the second channels, which are provided for at least two different plastics materials, in the nozzle body are provided on pitch circles of differing diameter and each set uniformly apart from one another.

As was mentioned hereinbefore, in the case of the injection head according to the invention, a time-efficient tool exchange of the at least one mouthpiece can be carried out in relation to the nozzle body if the at least one mouthpiece is releasably connected to the nozzle body. For this purpose, the nozzle body can have on its front end portion an annular flange having fastening holes and be releasably fastened to this annular flange on the at least one mouthpiece.

It is preferable, in the case of the injection head according to the invention, if the wound plastics distributor grooves, which are distributed uniformly in the circumferential direction of the lateral surface of the central body of the at least one mouthpiece, have, from the reverse surface, facing the main head, of the central body forward in the direction of flow, a decreasing groove depth and end at a front lateral annular portion of reduced diameter, so that an inner annular slot is formed between this front lateral annular portion of the central body and the sleeve body surrounding said front lateral annular portion. An annular widening, which leads at the front into the output annular slot of the corresponding mouthpiece, preferably adjoins this inner annular slot at the front.

It is preferable in this case if the annular widening with the output annular slot is determined radially outwardly by the sleeve body and radially inwardly by an end ring which is adjustably connected to the central body. As a result of the adjustability of this end ring, it is easily possible in a time-efficient manner continuously to adjust the nozzle gap of the output annular slot in a time-efficient manner as desired.

During an exchange of a module—for example consisting of a nozzle body and at least one mouthpiece—and the replacement thereof with another module, consisting of a nozzle body and at least one mouthpiece, the respective nozzle gap setting is advantageously preserved.

According to the invention, at least two mouthpieces can be joined together to form a mouthpiece unit. It is in this case expedient if the at least two mouthpieces are provided on a central pipe element and their central bodies are securely connected to one another to form the mouthpiece unit. In the case of an embodiment with two mouthpieces, third channel portions, which are flow-connected to the annular groove in the central body of the mouthpiece which is at the front in the direction of flow, extend axially through the central body of the mouthpiece adjoining the nozzle body.

In order to keep the melted plastics material or materials at an appropriate temperature in the injection head according to the invention, it is preferable if the main head and/or the nozzle body and/or the at least one mouthpiece are each provided on the outside with a heating means. The same applies to the intermediate body between the main head and the nozzle body. The respective heating means can be formed in a manner known per se by strip heaters.

BRIEF DESCRIPTION OF THE DRAWINGS

Further details, features and advantages will emerge from the subsequent description of an exemplary embodiment illustrated in the drawings of the injection head according to the invention for a corrugator for the production of two-layered plastics pipes.

In the drawings.

DETAILED DESCRIPTION OF THE INVENTION

Figure 1:
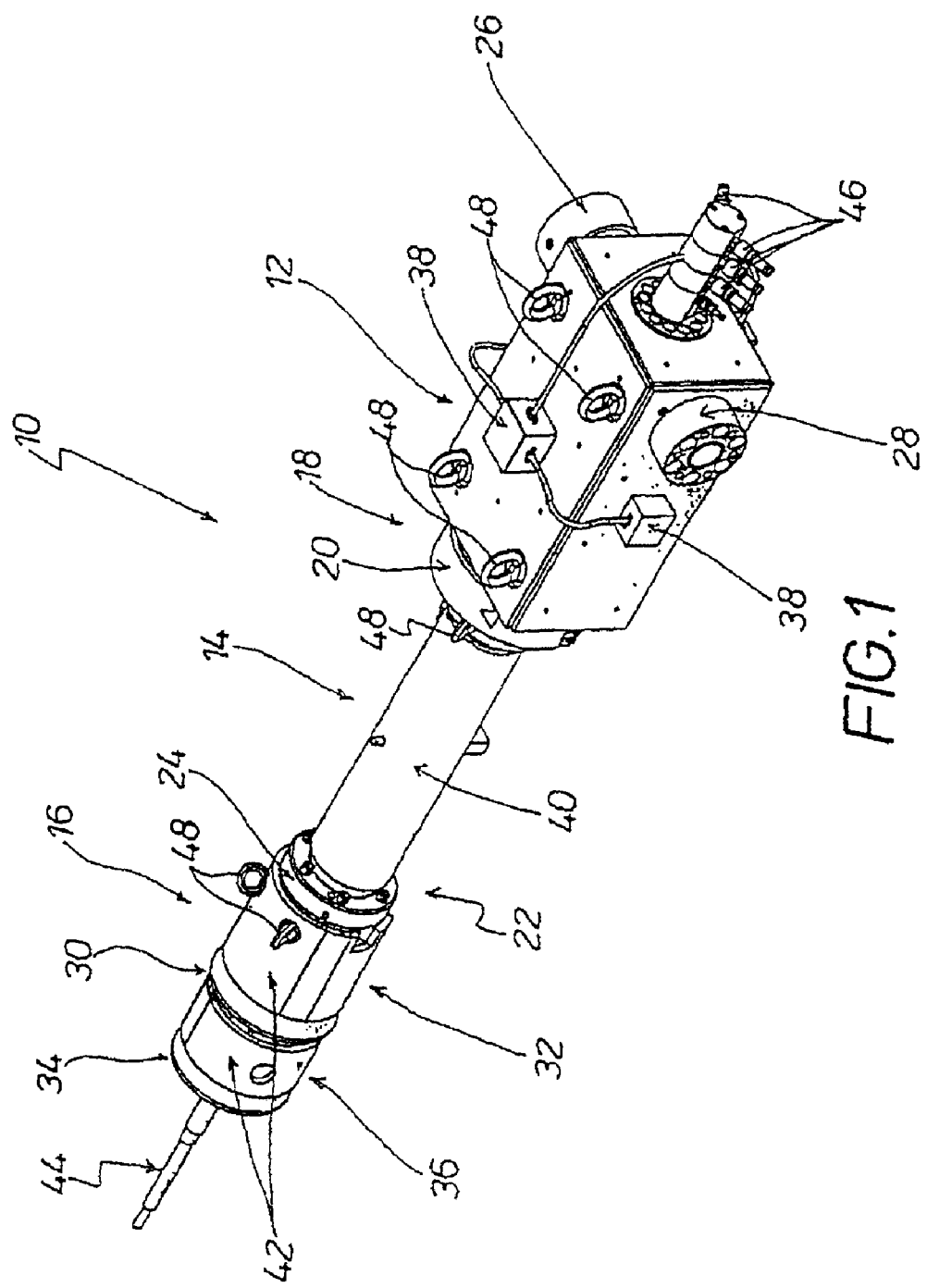
FIG. 1 is a perspective view of the injection head.

FIG. 1 is a perspective view of an embodiment of the injection head 10 for a corrugator for the production of plastics pipes having for example a smooth inner layer made of a first plastics material and a transversely corrugated outer layer which is integrally connected to said inner layer and is made of a second plastics material. The injection head 10 has a main head 12, a nozzle body 14 which is attached to the main head 12 so as to be in axial alignment and also a mouthpiece unit 16 which is attached to the nozzle body so as to be in axial alignment. For this purpose, the nozzle body 14 has on its back end portion 18 an annular flange 20 and on its front end portion 22 an annular flange 24.

The main head 12 of the injection head 10 has a first connection 26 for a first extruder and a second connection 28 for a second extruder by means of which the respective melted plastics material is introduced into the main head 12 and issues through the respectively associated output annular slot 30 in a first mouthpiece 32 of the mouthpiece unit 16 or through an output annular slot 34 in a second mouthpiece 36 of the mouthpiece unit 16 into a molding cavity of a molding section of a corrugator.

In order to keep the plastics materials in a melted state in the injection head 10 between its main head 12, the nozzle body 14 and the mouthpiece unit 16, the main head 12, the nozzle body 14 and the mouthpieces 32 and 36 of the mouthpiece unit 16 are each provided with a heating means 38, 40 or 42.

A central element 44, which is provided in a manner known per se for the conveying for example of cooling water, compressed air or the like, extends through the injection head 12. For this purpose, the central element 44 is combined on its back with connections 46 which protrude from the back of the main head 12.

Reference numeral 48 denotes crane eyes by means of which it is possible to transport or to handle the injection head 10 with the aid of a load crane or another lifting means.

Figure 2:
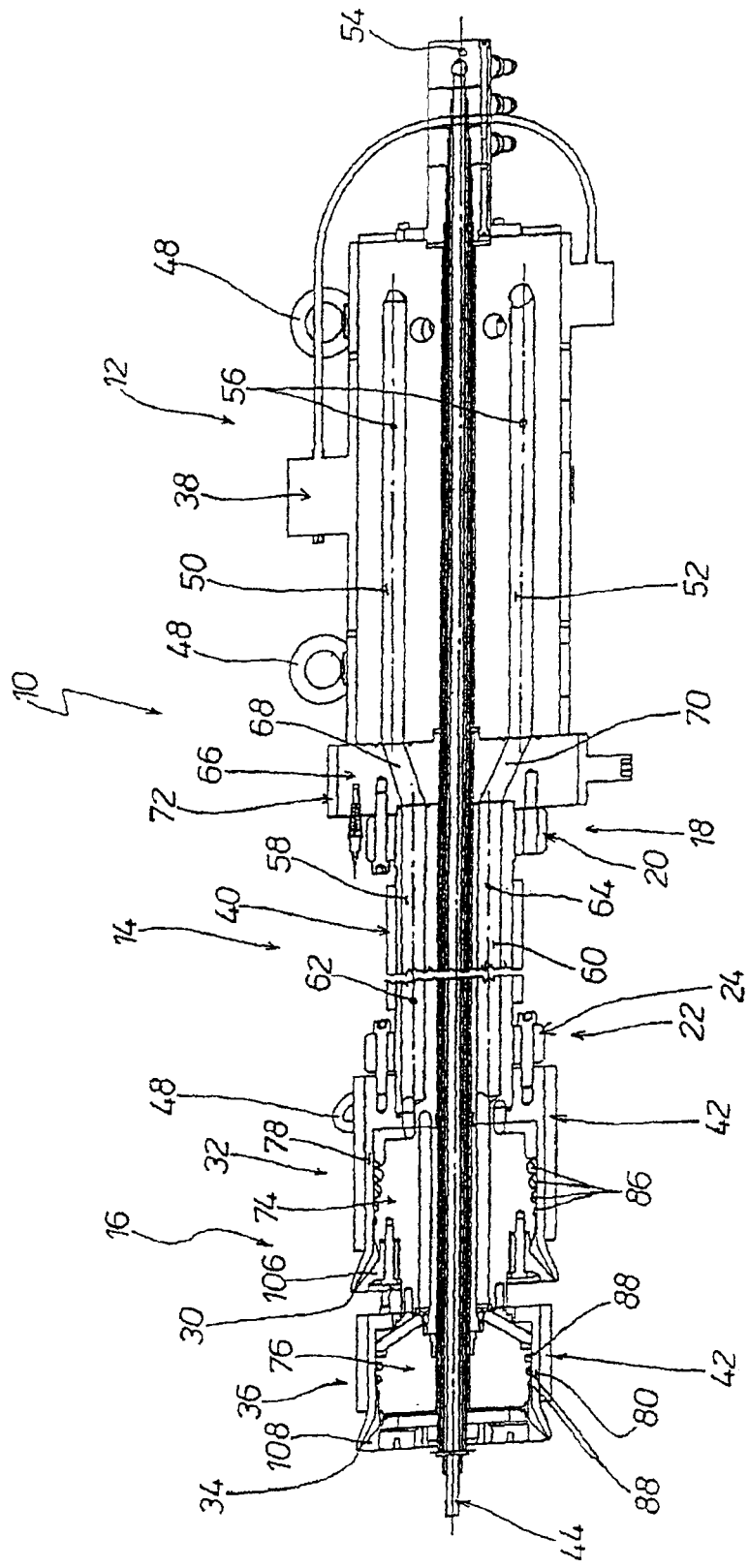
FIG. 2 is a cut-away longitudinal section of the injection head according to FIG. 1.

FIG. 2 is a longitudinal section of certain portions of the injection head 10 according to FIG. 1, wherein like details are denoted in FIG. 2 by the same reference numerals as in FIG. 1, so that there is no need to redescribe in depth all of these details in conjunction with FIG. 2. FIG. 2 illustrates that the main head 12 has first channels 50 for the first melted plastics material and first channels 52 for the second melted plastics material, of which FIG. 2 shows in each case only a first channel 50, 52. The first channels 50 are provided so as to be distributed uniformly in the circumferential direction of the main head 12 and flow-connected to the first connection 26 (see FIG. 1). The first channels 52 are also provided so as to be distributed uniformly in the circumferential direction of the main head 12 and flow-connected to the second connection 28 (see FIG. 1).

The first channels 50 and 52 are provided set uniformly apart on a common pitch circle 56 which is concentric with the central longitudinal axis 54 of the injection head 10 and alternate along the pitch circle 56. In other words, a respective first channel 50 and 52 adjoin each other in alternation in the circumferential direction of the pitch circle 56. For example, the main head 12 has three first channels 50 and three first channels 52 which determine on the common pitch circle 56 the corners of a regular hexagon.

The nozzle body 14, which in FIG. 2 is drawn cut through the center, is embodied with two channels 58 which are flow-connected to the first channels 50. The nozzle body 14 is also embodied with second channels 60 which are flow-connected to the first channels 52. The second channels 58 are arranged so as to be distributed uniformly on a pitch circle 62 which is concentric with the central axis 54 and the second channels 60 are arranged so as to be distributed uniformly on a pitch circle 64, the diameter of which is smaller than the diameter of the pitch circle 62.

The nozzle body 14 has smaller cross-sectional dimensions than the main body 12, and an intermediate body 66, which is embodied with transfer channels 68 and 70, is provided between the main body 12 and the nozzle body 14, the transfer channels 68 flow-connecting the first channels 50 of the main head 12 to the second channels 58 of the nozzle body 14 and the transfer channels 70 flow-connecting the first channels 52 of the main head 12 to the second channels 60 of the nozzle body 14.

The intermediate body 66 is—like the main head 12, the nozzle body 14 and the mouthpieces 32 and 36 of the mouthpiece unit 16—provided with a heating means 72.

Figure 3:
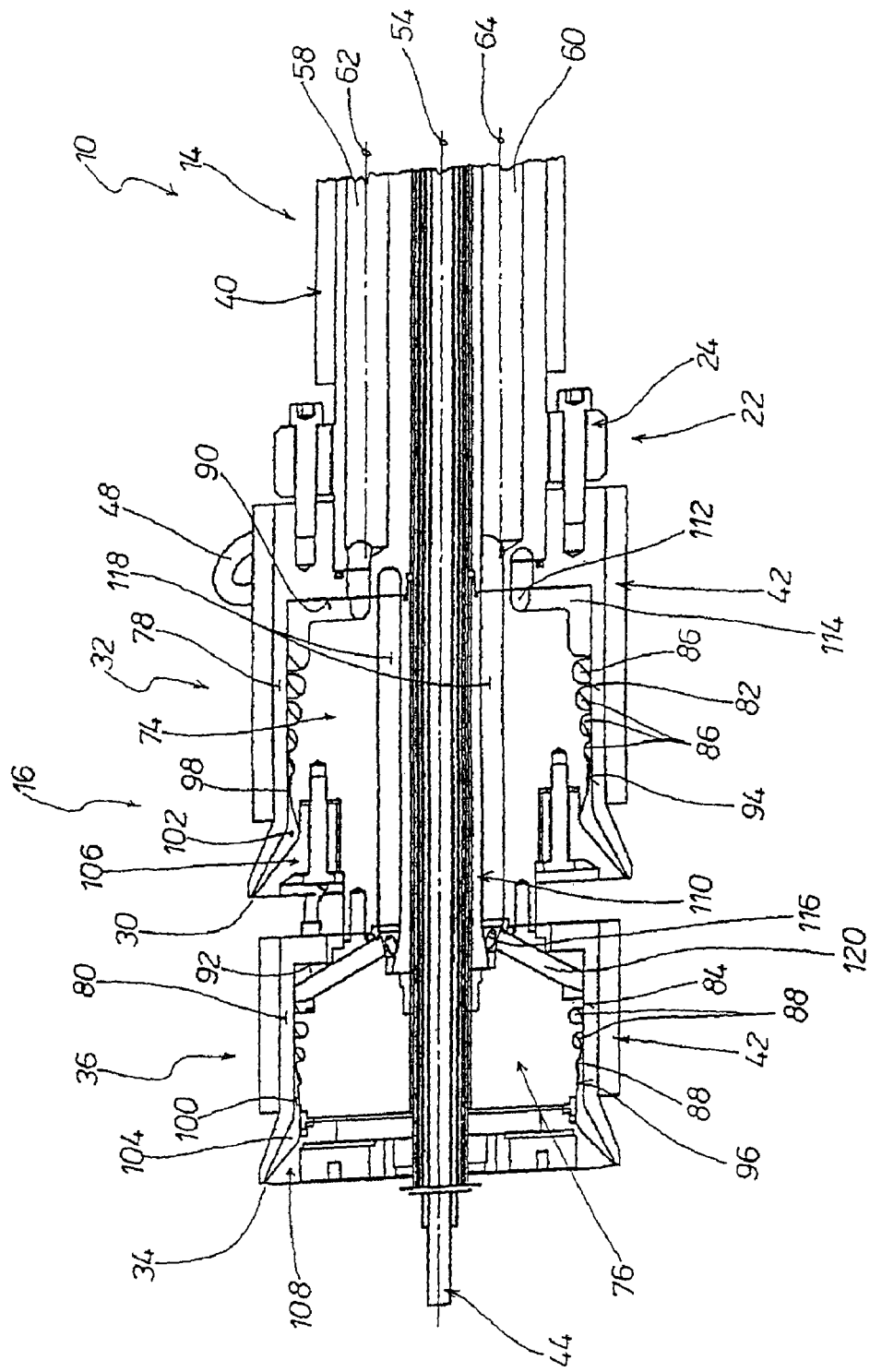
FIG. 3 is a longitudinal section of two mouthpieces which are joined together to form a mouthpiece unit on the nozzle body, portions of which are illustrated, of the injection head according to FIGS. 1 and 2.

FIG. 2, and in particular FIG. 3, illustrate that the respective mouthpiece 32, 34 has a central body 74, 76 and a sleeve body 78, 80 surrounding the respective central body. The respective central body 74, 76 has a lateral surface 82, 84 facing the associated sleeve body 78, 80. The respective lateral surface 82, 84 is embodied with plastics distributor grooves 86, 88 which are distributed uniformly in the circumferential direction of the corresponding central body 84, 86 and embodied so as to be wound at a slight gradient. The respective wound plastics distributor grooves, which are distributed uniformly in the circumferential direction of the lateral surface 82, 84 of the central body 74, 76 of the mouthpiece 32, 34, have, from the reverse surface 90, 92 of the central body 74, 76 forward toward the output annular slot 30, 34 in the first and second mouthpiece 32, 36, a decreasing groove depth and each end at a front lateral annular portion 94, 96 of the corresponding central body 74, 76. This determines between the respective front lateral annular portion 94, 96 and the sleeve body 78, 80 surrounding said front lateral annular portion an inner annular slot 98, 100 which is adjoined at the front in each case by an annular widening 102, 104. The respective annular widening 102, 104 leads at the front into the corresponding output annular slot 30, 34.

The respective annular widening 102, 104 with the associated output annular slot 30, 34 is determined radially outwardly by the associated sleeve body 78, 80 and radially inwardly by an end ring 106, 108 of the respective mouthpiece 32, 36. The respective end ring 106, 108 is connected in an axially adjustable manner to the associated central body 74, 76, so that it is easily possible in a time-efficient manner to set the slot width of the corresponding output annular slot 30, 34 as desired.

The two mouthpieces 32 and 36 of the mouthpiece unit 16 are provided on a central pipe element 110 through which the central element 44 extends.

The central body 74 of the mouthpiece 32 is embodied with an annular groove 112 on its reverse surface 90 which is concentric with the central axis 54 and into which the second channels 58 of the nozzle body 14 discharge. The annular groove 112 is flow-connected to the distributor grooves 86 in the central body 74 by means of angled connecting portions 114 which are provided set uniformly apart in the circumferential direction of the central body 74. The central body 74 is securely connected to the sleeve body 78 of the mouthpiece 32 with the aid of webs between the connecting portions 114. This connection is carried out for example with the aid of threaded bolts (not shown).

The central body 76 of the second mouthpiece 36 is also embodied with an annular groove 116 which concentrically encircles the central axis 54 and into which the second channel 60 of the nozzle body 14 is flow-connected by means of third channel portions 118 which extend axially through the central body 74 of the first mouthpiece 32.

The annular groove 116 in the central body 76 is flow-connected to the distributor grooves 88 on the lateral surface 84 of the central body 76 by connecting portions 120 which are provided so as to be distributed uniformly in the circumferential direction of the central body 76.

Like details are also denoted in FIG. 3 by the same reference numerals as in FIGS. 1 and 2, so that there is no need to describe in depth all of the details in conjunction with FIG. 3.

The invention claimed is:

1. An injection head for a corrugator for the production of plastics pipes, with a main head having at least one connection for a plastics extruder, with a nozzle body which is attached to the main head so as to be in axial alignment and with at least one mouthpiece which is attached to the nozzle body so as to be in axial alignment and has an output annular slot for the corresponding plastics material, the at least one mouthpiece having a central body and a sleeve body surrounding said central body which determine the associated output annular slot, the central body of the at least one mouthpiece having a lateral surface facing the respective sleeve body with wound plastics distributor grooves distributed uniformly in the circumferential direction, characterized in that the main head is embodied with axially oriented first channels which are distributed uniformly in the circumferential direction for the at least one plastics material, in that the nozzle body is embodied with axially oriented second channels which are distributed uniformly in the circumferential direction and are flow-connected to the first channels, in that the respective distributor groove is flow-connected by means of connecting portions to an annular groove which is formed on the reverse surface (90,92) of the central body and into which the second channels discharge, and in that the first channels are provided set uniformly apart from one another on a common pitch circle and alternate in association with the respective connection.

2. The injection head as claimed in claim 1, characterized in that the main head has at least two connections for extruders and a number of first channels corresponding to the number of connections.

3. The injection head as claimed in claim 1, characterized in that the nozzle body has smaller cross-sectional dimensions than the main head, and in that there is provided between the main head and the nozzle body an intermediate body which is embodied with transfer channels which flow-connect the first and the second channels and to one another.

4. The injection head as claimed in claim 3, characterized in that the intermediate body is securely connected to the main head.

5. The injection head as claimed in claim 4, characterized in that the nozzle body is releasably connected to the intermediate body.

6. The injection head as claimed in claim 5, characterized in that the nozzle body has on its back end portion an annular flange having fastening holes and is releasably fastened to the annular flange on the end face of the intermediate body.

7. The injection head as claimed in claim 3, characterized in that the second channels, which are provided for a plastics material, in the nozzle body are provided set uniformly apart from one another on a pitch circle.

8. The injection head as claimed in claim 3, characterized in that the second channels, which are provided for at least two different plastics materials, in the nozzle body are provided on pitch circles of differing diameter and each set uniformly apart from one another.

9. The injection head as claimed in claim 1, characterized in that the at least one mouthpiece is releasably connected to the nozzle body.

10. The injection head as claimed in claim 9, characterized in that the nozzle body has on its front end portion an annular flange having fastening holes and the at least one mouthpiece is releasably fastened to the annular flange.

11. The injection head as claimed in claim 1, characterized in that the wound plastics distributor grooves, which are distributed uniformly in the circumferential direction of the lateral surface of the central body of the at least one mouthpiece, have, from the reverse surface of the central body forward toward the output annular slot, a decreasing groove depth and end at a front lateral annular portion of reduced diameter, so that an inner annular slot is formed between this front lateral annular portion and the sleeve body surrounding said front lateral annular portion.

12. The injection head as claimed in claim 11, characterized in that an annular widening, which leads at the front into the output annular slot, adjoins the inner annular slot at the front.

13. The injection head as claimed in claim 12, characterized in that the annular widening with the output annular slot is determined radially outwardly by the sleeve body and radially inwardly by an end ring which is adjustably connected to the central body.

14. The injection head as claimed in claim 1, characterized in that at least two mouthpieces are joined together to form a mouthpiece unit.

15. The injection head as claimed in claim 14, characterized in that the at least two mouthpieces are provided on a central pipe element and their central bodies are joined together to form the mouthpiece unit.

16. The injection head as claimed in claim 14, characterized in that third channel portions, which are flow-connected to the annular groove in the central body of the front-adjoining mouthpiece, extend axially through the central body of the mouthpiece adjoining the nozzle body.

17. The injection head as claimed in claim 1, characterized in that the main head and/or the nozzle body and/or the at least one mouthpiece are each provided on the outside with a heating means.

* * * * *